United States Patent
Green et al.

(10) Patent No.: US 8,887,265 B2
(45) Date of Patent: *Nov. 11, 2014

(54) NAMED SOCKETS IN A FIREWALL

(71) Applicant: McAfee, Inc., Santa Clara, CA (US)

(72) Inventors: Michael Green, Shoreview, MN (US); David F. Diehl, Minneapolis, MN (US); Michael J. Karels, Eden Prairie, MN (US)

(73) Assignee: McAfee, Inc., Santa Clara, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/851,803

(22) Filed: Mar. 27, 2013

(65) Prior Publication Data

US 2013/0269021 A1 Oct. 10, 2013

Related U.S. Application Data

(63) Continuation of application No. 12/116,347, filed on May 7, 2008, now Pat. No. 8,429,736.

(51) Int. Cl.
G06F 21/00 (2013.01)
H04L 29/06 (2006.01)
H04L 29/08 (2006.01)

(52) U.S. Cl.
CPC .......... *H04L 63/0281* (2013.01); *H04L 63/029* (2013.01); *H04L 69/326* (2013.01)
USPC .................. 726/12; 726/13; 726/14; 726/15; 709/203; 709/217; 713/151; 713/152

(58) Field of Classification Search
CPC ..................................... H04L 63/029
USPC ......................................... 726/12
See application file for complete search history.

(56) References Cited

U.S. PATENT DOCUMENTS

| | | | |
|---|---|---|---|
| 7,296,292 B2 * | 11/2007 | Chang et al. | 726/13 |
| 2003/0154306 A1 | 8/2003 | Perry | |
| 2003/0177391 A1 | 9/2003 | Ofek et al. | |
| 2004/0059942 A1 | 3/2004 | Xie | |
| 2004/0250130 A1 | 12/2004 | Billharz et al. | |
| 2006/0168321 A1 | 7/2006 | Eisenberg et al. | |
| 2007/0162968 A1 * | 7/2007 | Ferreira et al. | 726/12 |
| 2007/0233877 A1 | 10/2007 | Qu et al. | |

FOREIGN PATENT DOCUMENTS

WO 2009/137009 A1 11/2009

OTHER PUBLICATIONS

International Search Report for PCT Application No. PCT/US2009/02710, mailed on Jun. 23, 2009, 2 pages.
International Preliminary Report on Patentability for PCT Application No. PCT/US2009/02710, mailed on Oct. 12, 2011, 12 pages.

* cited by examiner

*Primary Examiner* — Jason Lee
(74) *Attorney, Agent, or Firm* — Wong, Cabello, Lutch, Rutherford & Brucculeri, LLP

(57) ABSTRACT

A proxy device such as a firewall uses an internal socket namespace such as a text string such that connection requests must be explicitly redirected to a listening socket in the alternate namespace in order to connect to a service. Because external connections cannot directly address the listening socket or service, greater security is provided than with traditional firewall or proxy devices. To receive a redirected proxy connection, a service process creates a listening socket and binds a name in an alternate namespace to the socket before listening for connections.

18 Claims, 2 Drawing Sheets

NAMED SOCKETS IN A FIREWALL

FIELD OF THE INVENTION

The invention relates generally to managing threats on a network, and more specifically to named sockets in a firewall.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many corporations, institutions, and even home users use a network firewall or similar device between their local network and the Internet. The firewall is typically a computerized network device that inspects network traffic that passes through it, permitting passage of desired network traffic based on a set of rules.

Firewalls perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

Connections between computers are often described in terms of ports, sockets, and other network-specific terms. In computer networks, a port is typically a specific number included in a packet of network data that identifies the packet to a particular process or program running on the computer. Many numbers have become standard, such as use of port 80 for HTTP web browsing, use of port 25 to send mail to an SMTP server and use of port 110 to retrieve mail from a POP server, and use of port 443 for secure HTTP web connections.

Processes manage connections to various ports through sockets, which are often provided through an operating system and comprise source and destination communications endpoints identified by port and network address, along with protocol identification.

Managing the traffic flow between computers typically involves monitoring connections between various ports, sockets, and protocols, such as by examining the network traffic in a firewall. Rules based on socket and other information are used to selectively filter or pass data, and to log network activity.

SUMMARY

The invention comprises in one example a proxy device such as a firewall that uses an internal socket namespace such as a text string so that connection requests must be explicitly redirected to the alternate namespace in order to connect to a service. Because external connections cannot directly address the service, greater security is provided than with traditional firewall or proxy devices. To receive a redirected proxy connection, a service process creates a socket and binds a name to the socket in an alternate namespace before listening for connections.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention provides a proxy device such as a firewall that uses an internal socket namespace such as a text string so that connection requests must be explicitly redirected to the alternate namespace in order to connect to a service. Because external connections cannot directly address the service, greater security is provided than with traditional firewall or proxy devices. To receive a redirected proxy connection, a service process creates a socket and binds a name to the socket in an alternate namespace before listening for connections.

Figure 1:
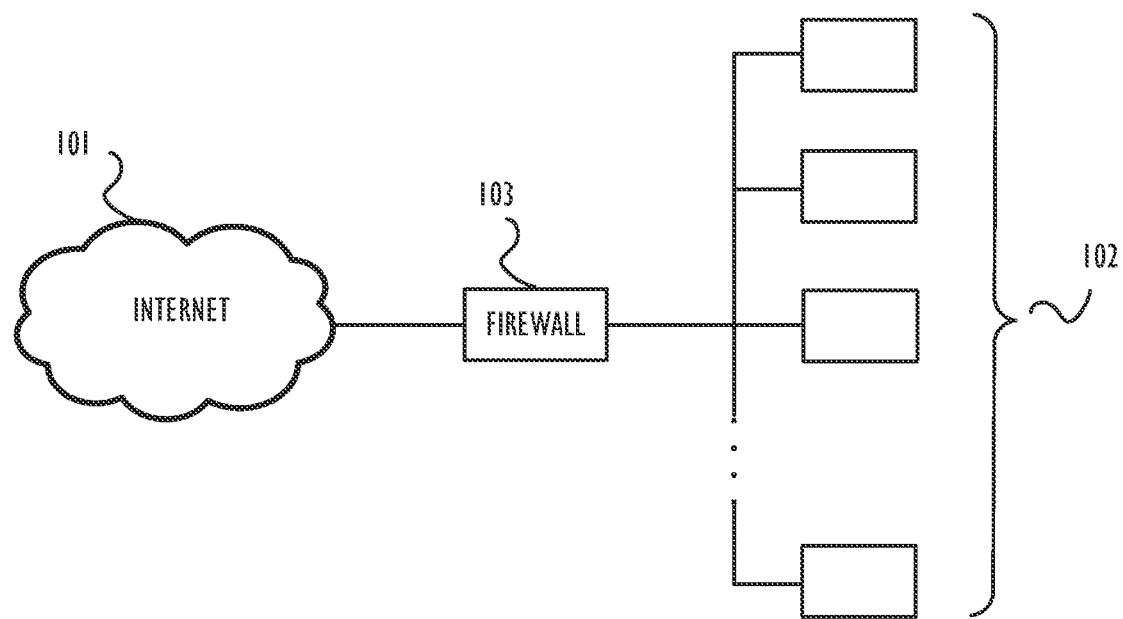
FIG. 1 is a block diagram of a computer network, as may be used to practice some embodiments of the invention.

FIG. 1 illustrates a typical network environment, including a public network such as the Internet at 101, a private network 102, and a computer network device operable to provide firewall and intrusion protection shown at 103. In this particular example, the computer network device 103 is positioned between the Internet and the private network, and regulates the flow of traffic between the private network and the public network.

The network device 103 is in various embodiments a firewall device, and intrusion protection device, or functions as both. A firewall device or module within the network device provides various network flow control functions, such as inspecting network packets and dropping or rejecting network packets that meet a set of firewall filtering rules. As described previously, firewalls typically perform their filtering functions by observing communication packets, such as TCP/IP or other network protocol packets, and examining characteristics such as the source and destination network addresses, what ports are being used, and the state or history of the connection. Some fire-walls also examine packets traveling to or from a particular application, or act as a proxy device by processing and forwarding selected network requests between a protected user and external networked computers.

Proxy devices often use standard port numbers to identify a particular service or type of data connection, such as use of port 80 for HTTP web browsing, use of port 25 to send mail to an SMTP server and use of port 110 to retrieve mail from a POP server, and use of port 443 for secure HTTP web connections. The proxy device can use the port number or other factors such as the apparent protocol type to determine the nature of many network connections. Program processes manage connections to various ports through sockets, which typically comprise source and destination communications endpoints identified by port and network address, along with protocol identification. Some proxy devices such as firewalls will manage the flow of traffic for a particular application, identifying data packets by the associated socket.

An Internet host computer system that includes a proxy-based firewall or server will normally assign incoming connection requests to an appropriate service process by having each service listen or monitor via a listening socket using a specific port number, such as a well-known or assigned port number typically associated with each service. Incoming requests normally include the target port as part of the TCP or UDP protocol data received in the connection request. But, often the same or similar services may be offered on a number of different ports in a computer system, and a firewall or other system will usually need to match authorized traffic to the correct service in applying rules to determine what traffic is authorized to connect to what service. The firewall device is also responsible for preventing unauthorized traffic directed to a specific port from accidentally being allowed to connect to a service listening on that port in the absence of a rule that specifically addresses traffic on that numbered port.

These issues have been addressed in some prior art systems by creating a separate socket for each port on which a service may be provided, and explicitly listening on those ports via a listening socket in a proxy device. Access control rules are configured for all such ports, as in a typical firewall environment. In a more sophisticated system, each service creates a single socket and allows the proxy system to choose a port number, such that the service listens on the assigned port and registers the port with a rule engine as the port in use for a particular service. An authorized connection request is transparently redirected to the specific port on which the service is listening on the network server via the proxy firewall, which protects against unauthorized connections going directly to the chosen service port number, such as a port scanner that probes all ports or if the chosen port number is a predictable port number.

Some embodiments of the invention solve some of these and other problems by using a separate, abstracted naming space from Internet ports in registering a listening service with a rule engine in a firewall or other proxy device such as an Intrusion Prevention System (IPS). In one such example, a service process creates a socket and binds a name to the socket in an alternate namespace before listening for connections. The name is in some examples a text string, such as a human-readable name, or any other numerical, text, or other identifying value. For example, a four-character string may be used, and include service names such as HTTP, FTP, HTPS, TLNT, and the like.

Figure 2:
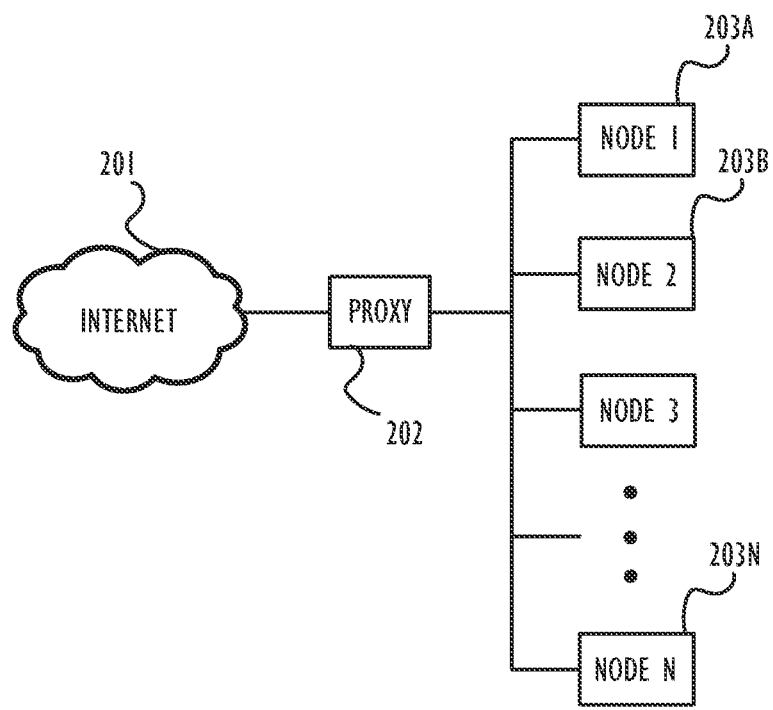
FIG. 2 is a block diagram of a computer network including a proxy firewall device, consistent with some embodiments of the invention.

FIG. 2 illustrates an example proxy firewall device, consistent with an example embodiment of the invention. In this example, a client computer on the Internet 201 attempts to connect to a server 203 over a network such as the Internet. A firewall proxy device 202 receives the connection request, and authorizes the connection and forwards the approved request to the appropriate server 203a-203n. In this example, the incoming request from the Internet is a connection to port 8080, on a particular IP address.

The firewall in this example does not simply inspect the incoming traffic and pass it through to port 8080 of a server associated with the IP address identified by the client computer, but instead creates a listen socket that acts in place of the server to receive the connection request, and forwards approved received data to the desired server as a proxy. In acting as a proxy device using listening sockets, the firewall creates an alternate namespace for the listening sockets and explicitly redirects incoming connection requests to the appropriate socket in the firewall. Here, the incoming connection is mapped to "HTTP" because the port number 8080, along with 80 and 443, are commonly associated with the HTTP protocol or service. In other embodiments, other or additional factors are used to determine what type of service or socket is most appropriate to handle an incoming connection request.

Once the firewall has mapped the incoming request to an internal listening socket named "HTTP", firewall or other rules appropriate to the connection type can be applied to the HTTP connection, which in some embodiments include only firewall, intrusion protection, or intrusion detection rules relevant to an HTTP connection. This scheme also provides more efficient rule application when multiple protocols share the same port on a server, and ensure policy conformance for a particular type of connection rather than guessing what protocols might be used over what ports.

For example, port 8080 is commonly used for HTTP, but a client may attempt to use the same port to establish an PIP connection, for legitimate or illegitimate reasons. Using named sockets, the firewall proxy server 202 can use other connection parameters, such as source address or port, to decide which service to use, such as mapping all FTP requests to port 21.

Connections are bound to rules by the connection properties, such as source port and address, destination port and address, and protocol. Because multiple rules may apply to a particular connection based on its connection properties, a service agent or proxy may still apply rules matching only specific protocols. For example, if a rule requires HTTP authentication, a service agent that understands HTTP authentication semantics such as a proxy will be employed to confirm the authentication. Associating rules based on particular services or protocols with particular system agents or proxies ensures that the proper rules are applied, while rules not applicable to a particular type of connection need not be considered.

Authorized incoming requests for a particular service, such as a port 80 request for an HTTP server, are directed to a listening socket in the alternate namespace using the appropriate name for the service, which in this example is HTTP. The rule engine is then able to apply any rules relating to an HTTP connection, such as to provide firewall, intrusion prevention, or intrusion detection functionality, to any traffic routed to a particular service via the abstracted service naming systems described here.

In a more detailed example, several service processes operating on different processor cores of a firewall device create ports that are associated with a listening socket called "HTTP", and rules in the proxy device redirect authorized traffic sent to ports 80, 443, and 8080 to the "HTTP" listening socket for service. The "HTTP" listening socket then selectively directs requests to an appropriate associated service process port in the firewall device based on load balancing or other criteria. Because multiple service processes and ports are associated with the "HTTP" listening socket, load-balancing across the various ports created by different processes operating on different processor cores in the firewall device ensures that no single processor, service, or socket becomes overly full while others are waiting idle or with extra unused capacity.

Using traditional sockets rather than named sockets, a listen socket must be provided on each port to ensure that connections destined for a particular service can connect to the service. By using a named listen socket associated with a particular service type rather than a particular instance of the service, the named socket can be associated with multiple instances of the service, each providing its own port. Because the abstracted named listen socket then comprises only a single socket for a particular service type, the complexity of listening can also be significantly improved if the number of ports providing a service type is large.

Incoming connection requests will not accidentally match the listening socket for the service and be able to create an unauthorized connection, as the named abstracted socket is identified by a string value in a name space distinct from the traditional numerical port and IP address socket identification system. Because the service is listening on a string-value name in a separate name space, the proxy architecture provides some assurance that an incoming connection has not reached a service through a proxy device such as a firewall without authorization. By separating the service identity from the port number, the firewall proxy device's mapping policy into the abstracted socket namespace becomes the sole mechanism by which an incoming connection can be associated with a service.

Service policy processing is also made more efficient, in that any connection that matches a policy rule based on factors available to the proxy device such as IP, TCP, or UDP data can be trusted to be authorized once the connection is associated with the named socket, so that further policy processing may not be necessary. Because the proxy device policies that explicitly redirect an incoming connection to a socket named in another name space are the only means by which an incoming connection can be associated with a service listening on a socket in this example, such a system also allows the same destination port to be associated with different services within the same rule set. The proxy device's use of different naming conventions for the service identity and rule selection mechanism also enables application of policies to a service identity associated with the named socket rather than to a port number, increasing performance of the proxy device and assurance that the proper policies are applied to each connection.

The above examples have shown how a proxy device such as a firewall can use an internal socket namespace such as a text string so that connection requests must be explicitly redirected to a socket listening in the alternate namespace in order to connect to a service. Because external connections cannot directly address the service, greater security is provided than with traditional firewall or proxy devices.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computer network proxy device, comprising:
a firewall comprising
a hardware processor; and
a mapping module operable to map one or more incoming connections on a set of first ports or sockets in a first namespace to a listening socket within the firewall identified in an alternate socket namespace,
wherein the computer network proxy device is operable to connect the incoming connections to one or more servers providing one or more services, and
wherein the listening socket identified in the alternate namespace comprises a named listening socket associated with two or more service processes operating in the firewall, such that the two or more service processes each have a socket associated with the listening socket's name in the alternate namespace and provide the service associated with the listening socket's name.

2. The computer network proxy device of claim 1, wherein names in the alternate socket namespace are associated with one or more types of services associated with the one or more incoming connections.

3. The computer network proxy device of claim 1, wherein the mapping module prevents incoming connections from directly addressing a given service.

4. The computer network proxy device of claim 1, wherein the alternate socket namespace comprises user-readable text strings.

5. The computer network proxy device of claim 1, wherein the mapping module is further operable to forward an incoming connection of the one or more incoming connections to a server providing a service via a socket that a service process operating in the firewall creates by binding a name in the alternate namespace to the socket before listening for connections, the server selected from the one or more servers and the service selected from the one or more services.

6. The computer network proxy device of claim 1, wherein the device is further operable to load balance connections provided through the named listening socket across the two or more service processes operating in the firewall associated with the named listening socket.

7. A method of operating a computer network proxy device, comprising:
mapping in a firewall by a hardware processor an incoming connection on a first port or socket in a first namespace to a listening socket within the firewall identified in an alternate socket namespace; and connecting the incoming connection to a server providing a service, wherein the listening socket identified in the alternate namespace comprises a named listening socket associated with two or more service processes, such that the two or more service processes each have a socket associated with the listening socket's name in the alternate namespace and provide the service associated with the listening socket's name.

8. The method of operating a computer network proxy device of claim 7, wherein names in the alternate socket namespace are associated with one or more types of services associated with the incoming connection.

9. The method of operating a computer network proxy device of claim 7, further comprising preventing the incoming connection from directly addressing the server providing the service.

10. The method of operating a computer network proxy device of claim 7, wherein the alternate socket namespace comprises user-readable text strings.

11. The method of operating a computer network proxy device of claim 7, further comprising forwarding the incoming connection to the server providing the service via a socket that a service process creates by binding a name in the alternate namespace to the socket before listening for connections.

12. The method of operating a computer network proxy device of claim 7, further comprising load balancing connections provided through the named listening socket across the two or more service processes associated with the named listening socket.

13. A non-transitory computer readable medium comprising instructions stored thereon to cause one or more processors of a computing device to:

configure a mapping module operable to map one or more incoming connections on a set of one or more first ports or sockets in a first namespace to a listening socket identified in an alternate socket namespace, wherein the one or more processors are further configured to connect the one or more incoming connections to one or more servers providing one or more services, wherein the listening socket identified in the alternate namespace comprises a named listening socket associated with two or more service processes, such that the two or more service processes each have a socket associated with the listening socket's name in the alternate namespace and provide the service associated with the listening socket's name.

14. The computer readable medium of claim 13, wherein names in the alternate socket namespace are associated with one or more types of services associated with the one or more incoming connections.

15. The computer readable medium of claim 13, wherein the mapping module prevents at least one of the one or more incoming connections from directly addressing a given service.

16. The computer readable medium of claim 13, wherein the alternate socket namespace comprises user-readable text strings.

17. The computer readable medium of claim 13, wherein the mapping module is further operable to forward one of the one or more incoming connections to the server providing the service via a socket that a service process creates by binding a name in the alternate namespace to the socket before listening for connections.

18. The computer readable medium of claim 13, wherein the instructions to cause the one or more processors to configure a mapping module further comprise instructions to cause the one or more processors to load balance connections provided through the named listening socket across the two or more service processes associated with the named listening socket.

* * * * *